United States Patent [19]

Wang

[11] Patent Number: 4,939,270

[45] Date of Patent: Jul. 3, 1990

[54] SPIRODILACTAM DIAMINES

[75] Inventor: Pen C. Wang, Houston, Tex.

[73] Assignee: Shell Oil Company, Houston, Tex.

[21] Appl. No.: 314,513

[22] Filed: Feb. 23, 1989

[51] Int. Cl.$^5$ ............................................ C07D 487/10
[52] U.S. Cl. ...................... 548/410; 548/147; 548/216; 548/323; 548/411; 540/543; 544/6; 544/70; 544/230; 546/15
[58] Field of Search ............... 548/410, 411, 147, 216, 548/323; 544/70, 6, 230; 546/15; 540/543

[56] References Cited

U.S. PATENT DOCUMENTS

| | | | |
|---|---|---|---|
| 2,149,678 | 3/1939 | Hovey et al. | 260/2 |
| 2,195,570 | 4/1940 | Hovey et al. | 260/55 |
| 2,279,752 | 4/1940 | Jacobson | 528/229 |
| 2,987,502 | 6/1961 | Ferstandig | 260/29.2 |
| 3,408,334 | 10/1968 | Caldwell et al. | 260/78 |
| 3,637,602 | 1/1972 | Conciatori | 260/78 |
| 3,778,411 | 12/1973 | Emerick et al. | 260/65 |
| 4,064,086 | 12/1977 | Cowsar et al. | 260/29.2 |
| 4,595,745 | 6/1986 | Nakano et al. | 528/125 |
| 4,847,388 | 7/1989 | Wang | 549/410 |
| 4,885,351 | 12/1989 | Wang | 526/262 |
| 4,886,863 | 12/1989 | Wang | 526/262 |
| 4,888,408 | 12/1989 | Wang | 528/96 |
| 4,889,907 | 12/1989 | Wang | 528/96 |

FOREIGN PATENT DOCUMENTS 43-22651 9/1968 Japan .

OTHER PUBLICATIONS

March, Advanced Organic Chemistry, 1968, p. 338.
Finar, Organic Chemistry, 6th Ed., 1973, p. 456.
Pariza et al., *Synthetic Communications,* vol. 13(3), pp. 243–254 (1983).
Hachihama et al., *J. Soc. Chem. Inc.,* Japan, 45, p. 406B (1942).
Hachihama et al., *J. Soc. Chem. Ind.,* Japan, 46, p. 119B (1943).
Kobayashi et al., *Sen-i Gakkaishi,* 14, pp. 888–891 (1958).

*Primary Examiner*—Anton H. Sutto
*Assistant Examiner*—Philip I. Datlow

[57] ABSTRACT

Primary diamines, employed in stoichiometric excess, react with a spirodilactam precursor selected from 4-oxoheptandioic acid compounds or 1,6-dioxaspiro[4.4]nonane-2,7-diones, to produce 1,6-diaza[4.4]spirodilactams having an amino-containing substituent on each spiro ring nitrogen atom. The spirodilactams are useful in the production of thermoplastic polyamides by reaction with diacids and as curing agents for epoxy resins in the production of thermoset resins.

14 Claims, No Drawings

SPIRODILACTAM DIAMINES

FIELD OF THE INVENTION

This invention relates to a novel class of amino substituted spirodilactams. More particularly, it relates to novel 1,6-diaza[4.4] spirodilactams having an amino-containing substituents on each spiro ring nitrogen atom.

BACKGROUND OF THE INVENTION

The reaction of diamino compounds with dibasic acids or equivalent compounds is well known in the art. In general, the typical product from such a reaction is a polymer, often a thermoplastic polymer. A commercial example is the production Nylon 66, illustratively produced by reaction of adipic acid (hexanedioc acid) and hexamethylenediamine. Reaction of aromatic dicarboxylic acids and diamines is shown by Nakama et al., U.S. Pat. No. 4,595,745, and Caldwell et al., U.S. Pat. No. 3,408,334. An arylalkenyl dicarboxylic acid and a diamine react according to the process of Conciatori, U.S. Pat. No. 3,637,602. The use of a dicarboxylic acid of additional functionality, i.e., 4-oxoheptanedioic acid (4-oxopimelic acid) is shown by Ferstandig, U.S. Pat. No. 2,987,502., but the reaction was with a glycol and the product was a polyester.

A class of compounds that functions in some ways similar to dicarboxylic acids is the class of 1,6-dioxa[4.4]spirodilactones. The simplest member of the series, 1,6-dioxaspiro[4.4]nonane-2,7-dione, is known and has been prepared, among several procedures, by the process of Pariza et al., Synthetic Communications, Vol. 13(3), pp. 243–254 (1983). These spirolactones have demonstrated utility as an epoxy curing agent to produce cured compositions which do not shrink during the curing process. It is likely that this reaction, as well as other reactions of such spirodilactones, produce a ring-opened product. See, for example, the above Pariza et al. article and Cowsar, U.S. Pat. No. 4,064,086. A reaction of the spirodilactones, or of 4-oxoheptanedioic acid compounds, which results in a cyclic product is shown by copending U.S. Pat. applications Ser. No. 172,000, filed March 23, 1988 now abandoned, Ser. No. 172,052, filed March 23, 1988 now abandoned and Ser. No. 245,618 filed Sept. 16, 1988. These applications disclose the reaction of the acidic materials with an aminophenol wherein the hydroxyl and amino groups are not located on adjacent carbon atoms. Reaction of these acidic compounds with a stoichiometric or excess amount of a primary diamine wherein the two amino groups are not on adjacent carbon atoms produces polymeric polyamides which incorporate spirodilactam moieties as shown by copending U.S. Pat. application Ser. No. 245,432, filed Sept. 16, 1988. It would be of advantage to provide a novel class of diamines incorporating spirodilactam moieties which are monomeric.

SUMMARY OF THE INVENTION

The present invention provides a novel class of 1,6-diaza [4.4] spirodilactams having an amino-containing substituent on each spiro ring nitrogen atom. More particularly, the invention relates to reaction of a spirodilactam precursor selected from 4-oxoheptanedioic acid compounds or 1,6-dioxa [4.4] spirodilactones with a diamine compound in a controlled reaction mixture ratio to produce a monomeric 1,6-diaza [4.4] spirodilactam having an amino-containing substituent on each spiro ring nitrogen atom.

DESCRIPTION OF THE INVENTION

The spirodilactam diamine compound is produced by reaction of an appropriate primary diamine compound, i.e., an organic compound having two primary amino groups (—NH$_2$ groups) with a spirodilactam precursor. In one modification of the invention, the spirodilactam precursor is a ketodicarboxylic acid compound of up to 30 carbon atoms having two carbon atoms between the keto group and each carboxy function. In other terms, the spirodilactam precursor of this modification is a 4-oxoheptanedioic acid compound. Although a variety of such ketodiacids having a variety of substituents in addition to the keto group and the acid functions are useful, the preferred 4-oxoheptanedioic acid compounds are those compounds of up to 30 carbon atoms inclusive which are represented by the formula

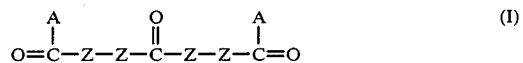

wherein A independently is hydroxy, alkoxy, preferably lower alkoxy of up to 4 carbon atoms inclusive, or halo, preferably the middle halogens chloro or bromo, and Z independently is >C(Z')$_2$ in which Z' independently is hydrogen, lower alkyl of up to 4 carbon atoms inclusive, preferably methyl, halo, preferably the lower halogens fluoro or chloro, or aryl, preferably phenyl, or Z is such that two adjacent Z groups taken together form a ring system Z'' of from 5 to 7 ring atoms, up to two of which are heteroatoms selected from nitrogen, oxygen or sulfur with the remainder of the ring atoms being carbon atoms, there being up to 15 carbon atoms in each Z'', two of which form a bridge between the carbon atoms connected by the adjacent Z groups.

In one embodiment employing the spirodilactam precursor of formula I, the ketodiacid is an acyclic 4-oxoheptanedioic acid compound wherein each Z is not a part of a fused cyclic substituent, i.e., Z is >C(Z')$_2$. In one such embodiment, largely because of a particularly convenient method of producing the spirodilactam precursor, the 4-oxoheptanedioic acid compound has at least one hydrogen present on each carbon atom adjacent to a carboxy function, that is, at least one Z' present on each carbon atom adjacent to a carboxy function is hydrogen. Such 4-oxoheptanedioic acid compounds are represented by the formula

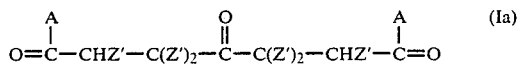

wherein A and Z' have the previously stated meanings. Such 4-oxoheptanedioic acid compounds include 4-oxoheptanedioic acid, dimethyl 4-oxoheptanedioate, 2,6-dimethyl-4-oxoheptanedioic acid, 2,3,4,5-tetramethyl-4-oxoheptanedioyl chloride, di-n-propyl 2,6-di-n-butyl4-oxoheptandioate and 6-carboxymethyl-2,3,5,5-tetramethyl-4-oxohexanoic acid. The preferred compounds of the above formula Ia are those wherein Z' is hydrogen or methyl, particularly hydrogen, and A is hydroxy or alkoxy, particularly hydroxy.

These ketodiacids are known compounds or are produced by known methods, but the esters of the above formula Ia are produced by the reaction of formaldehyde and an ethylenically unsaturated carboxylic acid ester such as methyl acrylate, ethyl methacrylate, butyl acrylate or methyl crotonate. The reaction is conducted in the presence of a catalyst system which comprises a thiazolium salt and a tertiary amine and produces the dialkyl 4-oxoheptanedioate derivative in good yield. This process is described in more detail and claimed in copending U.S. Pat. application Ser. No. 171,999, filed March 23, 1988, now U.S. Pat. No. 4,800,231, incorporated herein by reference. Conversion of the esters thereby obtained to the acids or the acid halides is by known methods.

In a second embodiment of the ketodiacid compound as a spirodilactam precursor, the 4-ketodiacid incorporates fused ring cyclic substituents between the keto group and each carboxy function, i.e., the adjacent Z groups are Z″. Such diacid compounds are represented by the formula

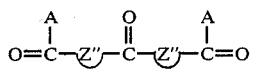
(Ib)

wherein A and Z have the previously stated meanings. Illustrative of these cyclic ketodiacid compounds are di(2-carboxycyclohexyl) ketone, di(2-carboxyphenyl) ketone, di(2-carbopropoxycyclo-4-pentenyl) ketone, di(2-chlorocarbonylphenyl) ketone, di(2-carboxypyridyl) ketone, 2-carboxyphenyl N-methyl-3-carboxy-3-pyrryl ketone, di(3-carboxy-2-morpholyl) ketone and di(2-carboxy-3-chlorophenyl) ketone. The preferred cyclic ketodiacid compounds of formula Ib are those wherein each Z″ is a ring system of from 5 to 6 ring atoms and up to one nitrogen atom, particularly benzo.

The cyclic ketodiacid compounds of formula Ib are known compounds or are produced by known methods, for example the method of Conover et al., U.S. Pat. No. 1,999,181 or by the method of Cava et al., J. Am. Chem. Soc., 77, 6022(1955).

In yet another modification of the ketodiacid compound as the spirodilactam precursor, the ketodiacid compound incorporates one cyclic moiety with the remainder of the Z moieties being acyclic i.e., the compounds of the formula

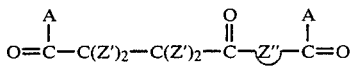
(Ic)

wherein A, Z′, and Z″ have the previously stated meanings. Such ketodiacid compounds of one cyclic substituent are illustrated by 3-(2-carboxybenzoyl) propionic acid, 3-(2-carbomethoxy-2-pyridyloyl)-2-ethylpropionic acid, ethyl 3-(2-carbethoxybenzoyl)propionate and 3-(2-carboxy-4-methylbenzoyl)butyl chloride. The ketodiacids of formula Ic are known compounds or are produced by known methods. For example, 2-carbomethoxybenzaldehyde reacts with methyl acrylate according to the general teachings of copending U.S. Pat. application Ser. No. 171,999, now U.S. Pat. No. 4,800,231 filed March 23, 1988, to produce 3-(2-carbomethoxybenzoyl)propionate.

In a second modification of the invention, the spirodilactam precursor is a 1,6-dioxaspiro[4.4]nonane-2,7-dione compound of up to 30 carbon atoms wherein the spiro ring system is substituted with hydrogen or other monovalent groups or incorporates fused ring substituents which include the 3- and 4- spiro ring positions and/or the 8- and 9- spiro ring positions of the spiro ring system. One class of such spirodilactones is represented by the formula

(II)

wherein Z has the previously stated meaning. In the embodiment of these spirodilactone spirodilactam precursors of the above formula II wherein each Z is >C(Z′)₂, the spirodilactone is represented by the formula

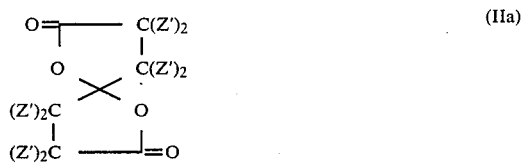
(IIa)

wherein Z′ has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 3,4,8,9-tetramethyl-1,6-dioxaspiro [4.4]nonane-2,7-dione, 3,3,8,8-tetramethyl-1,6-dioxaspiro[4.4]nonane-2,7-dione, 3,3,4,4,8,8,9,9-octamethyl-1,6-diazaspiro[4.4]nonane-2,7-dione and 3,4,8,9-tetrafluoro-1,6-diazaspiro[4.4]nonane-2,7-dione. The preferred spirodilactones of formula IIa are those wherein at least one Z′ of each Z′-substituted carbon atom is hydrogen. The compounds of formula IIa are known compounds or are produced by known methods such as by the process of the above Pariza et al. article, incorporated herein by reference.

In the embodiment of the spirodilactam precursors of formula II which incorporate a fused cyclic substituent as a part of each of the two rings of the spiro ring system, the spirodilactone are represented by the formula

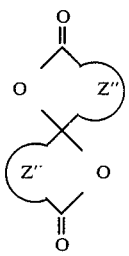
(IIb)

wherein Z″ has the previously stated meaning. Typical compounds of this formula IIb are 3,4,8,9-dibenzo-1,6-dioxaspiro[4.4]nonane-2,7-dione, 3,4,8,9-dibenzo-1,6-dioxaspiro[4.4]nonane-2,7-dione, 3,4,8,9-di(cyclopentano)-1,6-dioxaspiro[4.4]nonane-2,7-dione, 3,4,8,9-di(methylbenzo)-1,6-dioxaspiro[4.4]nonane-2,7-dione and 3,4,8,9-di(pyrido)-1,6-dioxaspiro[4.4]nonane-2,7-dione.

These spirodilactones are known compounds or are produced by known methods such as, for example, the process of the above Cava et al. article or by the general process of Conover et al., U.S. Pat. No. 1,999,181.

In a third embodiment of a spirodilactone as spirodilactam precursor, a cyclic substituent is fused to one spiro ring and the other spiro ring is free of fused ring substituents. Such spirodilactones are represented by the formula

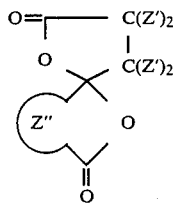 (IIc)

wherein Z', and Z" have the previously stated meaning. Such spirodilactones are illustrated by 3-methyl-8,9-benzo-1,6-dioxaspiro[4.4]nonane-2,7-dione, 3,4-benzo-1,6-dioxaspiro[4.4]nonane-2,7-dione and 3,3,4,4-tetramethyl-8,9-morpholo-1,6-dioxaspiro[4.4]nonane-2,7-dione. The spirodilactones of the above formula IIc are produced by known methods, for example, by the dehydration of the corresponding ketoacid. By way of illustration, 3,4-benzo-1,6-dioxaspiro[4.4]nonane-2,7-dione is produced by dehydration of 3-(2-carboxybenzoyl)-propionic acid through application of heat.

In general, the preferred spirodilactones to be employed as spirodilactam precursors are hydrocarbyl except for the oxygen atoms of the lactone moieties, particularly those spirodilactones which are free of fused ring substituents (formula IIa) or which have a fused ring substituent on each spiro ring (formula IIb). The compound 1,6-dioxaspiro[4.4]nonane-2,7-dione is an especially preferred member of the former class while 3,4,8,9-dibenzo-1,6-dioxaspiro[4.4]nonane-2,7-dione is an especially preferred member of the latter class.

The spirodilactam precursor is reacted according to the process of the invention with a primary diamine, that is, an organic compound having two primary amino groups, i.e., —NH$_2$ groups, as carbon atom substituents. While the process of the invention will take place with a variety of primary diamines of varying structure, best results are obtained in the process of the invention if the two amino groups are not located on adjacent carbon atoms, that is, at least one atom, carbon or otherwise, separates the two carbon atoms on which the primary amino groups are substituted. One class of such primary diamines comprises primary diamines of up to 30 carbon atoms inclusive which are represented by the formula

H$_2$N—R—NH$_2$ (III)

where R is a divalent organic radical of up to 30 carbon atoms inclusive and is divalent alkylene or divalent arylene of 1 or 2 aromatic rings which, when two rings are present, incorporates rings which are fused or which are connected by a link, X, wherein X is a direct valence bond, alkylene of up to 8 carbon atoms inclusive, oxy, thio, sulfonyl, carbonyl, dioxyphenylene, ie., 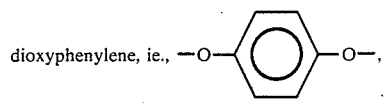

2,2-di(oxyphenyl)propane, i.e.,
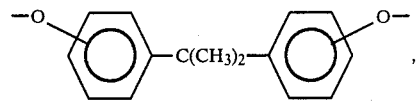

di(oxyphenyl)sulfone, i.e., 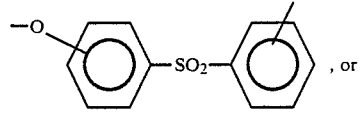, or dioxyphenylene, 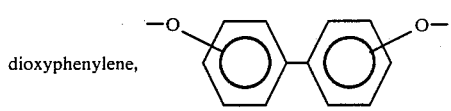, with the proviso that the two amino groups are not located on adjacent carbon atoms. R is hydrocarbyl, that is, contains only atoms of carbon and hydrogen besides any other atoms in the link X, or is substituted hydrocarbyl containing additionally other atoms as inert, monovalent substituents on carbon atoms such as halo, preferably middle halo.

Illustrative of alkylene-containing diamines of the above formula III are trimethylenediamine, tetramethylenediamine, hexamethylenediamine, octamethylenediamine, 1,7-diamino-4-methyloctane, 1,4-diaminocyclohexane, 1,10-diamine-5-chlorodecane and 1,6-diamino-3,4-diethylhexane. Arylene diamines of the above formula III include p-phenylenediamine, 2,4-toluenediamine, 4,4'-diaminophenyl) ether, di(4-aminophenyl)methane, 2,2-di(3-amino-4-methylphenyl)propane, di(4-amino-2-ethylphenly)sulfone, di(3-amino-4-chlorophenyl)ketone, di(2-aminophenyl)sulfide, 1,3-di(4-aminophenyloxy)benzene, 2,2-di[4-(4-aminophenyloxy)phenyl]propane and 4,4'-di(4-aminophenyloxy)biphenyl. The preferred primary diamines are those diamines of the above formula III wherein R is divalent arylene and is hydrocarbyl except for any additional atoms present in any X. Particularly preferred are the di(aminophenyl)alkanes such as di(4-aminophenyl)alkane. Also particularly preferred are arylene groups of a single aromatic ring, e.g., p-phenylenediamine.

In the reaction mixture, the ratio of the primary diamine to the spirodilactam precursor is of importance. If an excess of the spirodilactam precursor is employed, a polymeric product such as that described in copending U.S. Pat. application Ser. No. 245,432 filed Sept. 16, 1988 is likely to be obtained as the principal product. To obtain the monomeric product of the invention the molar ratio of primary diamine to spirodilactam precursor should be greater than 2:1 and preferably up to about 8:1. The reaction is conducted in the liquid phase in the presence of a reaction diluent. Suitable reaction diluents are those which are inert to the reactants and product under reaction conditions and which will dissolve at least a portion of each reactant at reaction temperature. Such diluents include ethers, e.g., acyclic ethers such as diethylene glycol dimethyl ether and tetraethylene glycol dimethyl ether as well as cyclic ethers such as tetrahydrofuran and dioxolane, N-alkylamides such as N,N-dimethylacetamide and N-methyl-2-pyrrolidone, and sulfur-containing diluents such as dimethyl sulfoxide and sulfolane. It is particularly convenient to employ as a diluent, either alone or in combination with other diluents. A material with which water forms an azeotrope. This procedure facilitates the reaction and allows the water by-product to be removed as a generally low-boiling azeotrope.

The reaction of primary diamine and the spirodilactam precursor takes place in a suitable reactor under reaction conditions which will typically include a reaction temperature of from about 50° C. to about 250° C. but more often from about 100° C. to about 200° C. Suitable reaction pressures are sufficient to maintain the reaction mixture in a liquid phase, e.g., pressures from about 1 atmosphere to about 20 atmospheres. During the reaction period, the contact of the reactants is maintained by conventional methods such as stirring or refluxing and subsequent to reaction the product is recovered by well-known techniques such as solvent removal or precipitation.

The spirodilactam diamine product of the invention is a 1,6-diaza [4.4] spirodilactam having an amino-containing substituent on each of the spiro ring nitrogen atoms, which substituent is a residue of the primary diamine when one of the primary amino groups has participated in spirodilactam production. In terms of the spirodilactam precursors (formulas I and II) and the primary diamine reactant (formula III), the product is represented by the formula

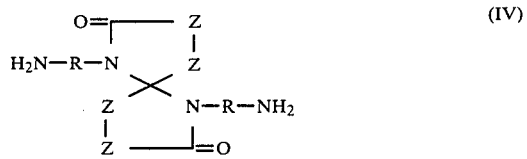 (IV)

wherein R and Z have the previously stated meanings. The identity and nomenclature of such products will be apparent from consideration of the formulas for the reactants and product and the description of the reactants. By way of illustration, however, is 1,6-di(4-aminophenyl)-1,6-diazaspiro [4.4]nonane-2,7-dione illustratively produced from p-phenylenediamine and either 4-oxoheptandioic acid or 1,6-dioxaspiro[4.4]nonane-2,7-dione, 1,6-di(3-aminophenyl)-3,4,8,9-dibenzo-1,6-diazaspiro[4.4]nonane-2,7-dione illustratively produced from m-phenylenediamine and either di(2-carboxyphenyl)ketone or 3,4,8,9-dibenzo-1,6-dioxaspiro4.4]nonane-2,7-dione, and 1,6-di[4]-(4-aminophenyl-methyl)phenyl]-1,6-diasaspiro[4.4]nonane-2,7-dione illustratively produced from di(4-aminophenyl)methane and either dimethyl 4-oxoheptanedioate or 1,6-dioxaspiro[4.4]nonane-2,7-dione.

The spirodilactam diamine products of the invention are difunctional amines having a polycyclic central portion. They are useful, for example, in the reaction with diacids to produce thermoplastic polyamides which, in part because of the cyclic structure, have relatively high melting points or glass transition temperatures which enable application where dimensional stability at elevated temperatures is desired. Alternatively, the diamines are useful as curing agents for epoxy resins to produce thermoset resins, also useful in high temperature applications.

The invention is further illustrated by the following Illustrative Embodiments which should not be construed as limiting the invention.

ILLUSTRATIVE EMBODIMENT I

A mixture of 27.03 g (0.25 mole) of p-phenylenediamine, 15.6 g (0.1 mole) 1,6-dioxaspiro[4.4]nonane-2,7-dione, 50 ml of toluene and 250 ml of N-methyl-2-pyrrolidone was heated while being stirred to 140°-150° C. and water present or formed was removed by azeotropic distillation. When water removal was complete, the temperature of the mixture was raised to 180° C. and maintained at that temperature for 1 hour. The resulting mixture was cooled and poured into ether. The precipitated product was recovered by filtration, washed with ethyl acetate and dried in a vacuum oven. The product had a melting point of 137-148° C. and the nuclear magnetic resonance spectra were consistent with the structure. The spirodilactams are useful in the production of thermoplastic polyamides by reaction with diacids and as curing agents for epoxy resins in the production of thermoset resins.

ILLUSTRATIVE EMBODIMENT II

The procedure of Illustrative Embodiment I was repeated except that 17.4 g (0.1 mole) of 4-oxoheptanedioic acid was used instead of the spirodilactone. The recovered, dried product had a melting point of 143°-146° C.

What is claimed is:

1. A 1,6-diaza[4.4]spirodilactam having an amino-containing substituent of up to 30 carbon atoms on each spiro ring nitrogen atom, with said amino group located on the terminal carbon atom.

2. The substituted spirodilactam of claim 1 of the formula

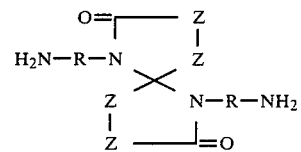

wherein R is a divalent organic radical of up to 30 carbon atoms selected from divalent alkylene or divalent arylene of 1 or 2 aromatic rings which, when two rings are present are fused or joined by X wherein X is a direct valence bond, alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene, and Z independently is >C(Z')₂ in which Z' independently is hydrogen, lower alkyl, lower halo or phenyl, or Z is such that two adjacent Z groups form a ring system Z'' of from 5 to 7 ring atoms up to 2 of which are heteroatoms selected from nitrogen, oxygen or sulfur with the remainder of the ring atoms being carbon atoms, there being up to 15 carbon atoms in each Z'', two of which form a bridge between a keto carbon atom and a spiro carbon atom.

3. The spirodilactam of claim 2 wherein each R is divalent arylene.

4. The spirodilactam according to claim 2 or 3 wherein Z is >C(Z')₂.

5. The spirodilactam of claim 4 wherein Z' is hydrogen or methyl.

6. The spirodilactam of claim 5 wherein R is phenylenemethylphenyl.

7. The spirodilactam of claim 6 wherein Z' is hydrogen.

8. The spirodilactam of claim 5 wherein R is phenylene.

9. The spirodilactam of claim 8 wherein Z' is hydrogen.

10. The spirodilactam of claim 9 wherein R is p-phenylene.

11. The spirodilactam according to claim 2 or 3 wherein adjacent Z groups are Z''.

12. The spirodilactam of claim 11 wherein R is phenylenemethylphenyl.

13. The spirodilactam of claim 11 wherein R is phenylene.

14. The spirodilactam of claim 13 wherein Z'' is benzo.

* * * * *